US012811514B2

(12) United States Patent
Orr

(10) Patent No.: US 12,811,514 B2
(45) Date of Patent: Nov. 24, 2026

(54) MULTI-STAGE POWER CONVERTERS AND POWER CONVERTER CONTROL METHODS

(71) Applicant: VERMILLION POWER TECHNOLOGIES INC., Calgary (CA)

(72) Inventor: Raymond Kenneth Orr, Calgary (CA)

(73) Assignee: Vermillion Power Technologies Inc., Calgary (CA)

( * ) Notice: Subject to any disclaimer, the term of this patent is extended or adjusted under 35 U.S.C. 154(b) by 191 days.

(21) Appl. No.: 18/723,538

(22) PCT Filed: Dec. 16, 2022

(86) PCT No.: PCT/CA2022/051844
§ 371 (c)(1),
(2) Date: Jun. 24, 2024

(87) PCT Pub. No.: WO2023/122828
PCT Pub. Date: Jul. 6, 2023

(65) Prior Publication Data

US 2025/0062698 A1 Feb. 20, 2025

Related U.S. Application Data

(60) Provisional application No. 63/294,948, filed on Dec. 30, 2021.

(51) Int. Cl.

| | |
|---|---|
| ***H02M 7/49*** | (2007.01) |
| ***H02M 1/00*** | (2006.01) |
| *H02M 7/5395* | (2006.01) |

(52) U.S. Cl.
CPC ........... *H02M 7/49* (2013.01); *H02M 1/0054* (2021.05); *H02M 1/0074* (2021.05); *H02M 1/007* (2021.05); *H02M 7/5395* (2013.01)

(58) Field of Classification Search
CPC .... H02M 7/49; H02M 1/0054; H02M 1/0074; H02M 1/007; H02M 7/5395
See application file for complete search history.

(56) References Cited

U.S. PATENT DOCUMENTS

| | | | | |
|---|---|---|---|---|
| 2015/0280608 A1* | 10/2015 | Yoscovich | ............ | H02M 7/483 363/131 |
| 2021/0091701 A1* | 3/2021 | Baeurle | ................. | H02P 27/085 |

OTHER PUBLICATIONS

International Search Report and Written Opinion issued on Mar. 22, 2023 in respect of PCT/CA2022/051844 (10 pages).

* cited by examiner

*Primary Examiner* — Crystal L Hammond
*Assistant Examiner* — Jonathan Walter Soileau

(57) ABSTRACT

Multi-stage power converters and power converter control methods are disclosed. In some embodiments, switching in one of the switching stages of a multi-stage power converter is at high frequency relative to a frequency of AC power, and switching of another one of the switching stages is at lower frequency relative to the frequency of the AC power. Switching control may also or instead be based on an m-bit digital word. A pulse width modulation output based on n least significant bits of the digital word is used to control switching in one of the switching stages, and further outputs based on (m−n) most significant bits of the digital word are used to control switching in other switching stages.

20 Claims, 16 Drawing Sheets

MULTI-STAGE POWER CONVERTERS AND POWER CONVERTER CONTROL METHODS

CROSS-REFERENCE TO RELATED APPLICATIONS

This application is a National Stage of International Application No. PCT/CA2022/051844, which claims priority from U.S. Provisional Patent Application No. 63/294,948 filed on Dec. 30, 2021, each of which is hereby incorporated in its entirety herein by reference.

FIELD

The present disclosure relates generally to the field of power conversion and power electronics, and in particular, to Direct Current (DC)/Alternating Current (AC) power conversion and control.

BACKGROUND

Inverters are a type of power converter, and are designed around two major topological configurations. These configurations include: full-bridge switch arrangements in which four or more semiconductor switches rated for potentials greater than peak AC voltage are used to switch polarity and control amplitude via pulse width modulation; and arrangements of multiple smaller voltage sources connected in series that are switched on sequentially to construct an output waveform.

SUMMARY

According to an aspect of the present disclosure, an apparatus includes a first power interface, a second power interface, a multi-stage switching system, and a controller. The multi-stage switching system is coupled to the first power interface and to the second power interface, and includes multiple switching stages to convert between DC power at the first power interface and AC power at the second power interface. The switching stages are coupled together in a circuit path across the second power interface. The controller is coupled to the multi-stage switching system, to control switching in one of the switching stages at high frequency relative to a frequency of the AC power, and to control switching of another one of the switching stages at lower frequency relative to the frequency of the AC power.

A method involves controlling, in such a multi-stage switching system, switching in one of the switching stages at high frequency relative to a frequency of the AC power. A method may also involve controlling switching of another one of the switching stages at lower frequency relative to the frequency of the AC power.

An apparatus according to another aspect of the present disclosure includes a first power interface, a second power interface, and such a multi-stage switching system, but also includes a controller, coupled to the multi-stage switching system, to control switching in the switching stages based on a digital word. The digital word includes m bits, and the controller is configured to generate a pulse width modulation (PWM) output based on n least significant bits of the digital word to control switching in one of the switching stages, and to generate further outputs based on (m−n) most significant bits of the digital word to control switching in switching stages other than the one of the switching stages.

According to yet another aspect of the present disclosure, a method involves controlling switching in such a multi-stage switching system. The controlling involves generating a PWM output based on n least significant bits of the digital word to control switching in one of the switching stages; and generating further outputs based on (m−n) most significant bits of the digital word to control switching in switching stages other than the one of the switching stages.

Other aspects and features of embodiments of the present disclosure will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

Figure 1:
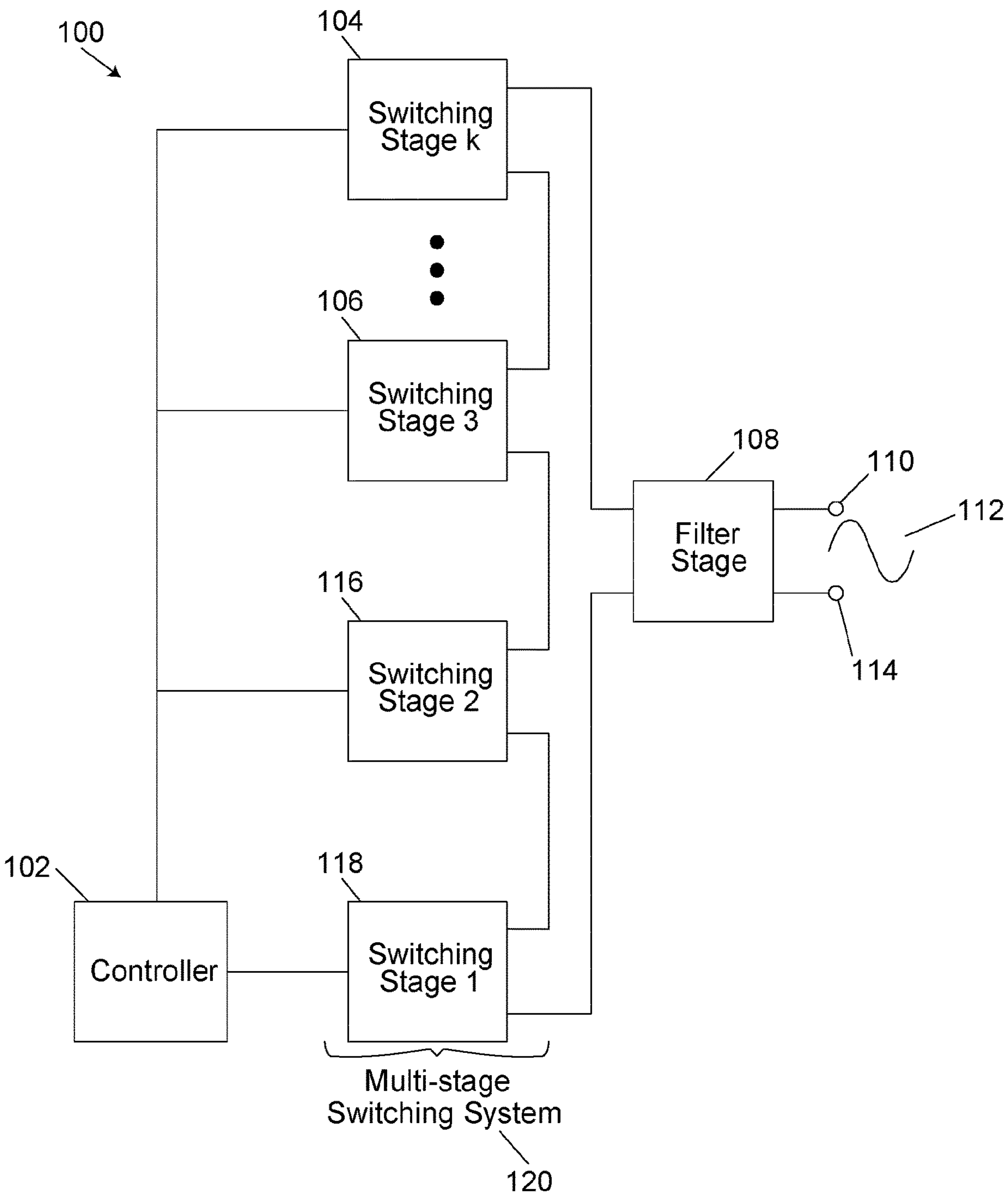
FIG. 1 is a block diagram illustrating a power converter according to one embodiment.

Some embodiments of the present disclosure relate to multi-level or multi-stage power converters in which only one switching stage, or at least not all switching stages, are switched at high frequency. The stage(s) driven at high frequency may be at or near a ground reference potential of a controller, for example, to potentially simplify driving of switches and/or sensing of current and voltage. Other switching stages may be switched at lower frequency, such as twice the frequency of an AC output in the case of an inverter. Such a low drive frequency or switching frequency, and a relatively simple logic circuit involved in driving switches, may result in very low drive power requirements, which in turn may result in simpler auxiliary power circuits.

The number of switching stages can be chosen based on switch voltage, such as drain-source voltage in the case of Metal Oxide Semiconductor Field Effect Transistors (MOSFETs) as the switches in the switching stages, to lower or potentially minimize conduction or switching losses for a given die area. For MOSFETs, a preferred rated drain-source voltage is 100V in some embodiments. MOSFETs may be particularly preferred for their relatively low on-state resistance compared to other, higher voltage, switches. For example, the total on-state resistance of all switches in a MOSFET-based multi-stage switching system may be less than the resistance of higher voltage switches, with the combined die area of multiple lower voltage MOSFETs being less than that of higher voltage switches.

In addition, according to embodiments disclosed herein, only one pair of low voltage MOSFETs are switching at high frequency. Current may be the same as in a topology with fewer high voltage MOSFETs but switched voltage is a fraction of the higher voltage and dice can be smaller, so switching loss can be much lower.

100V MOSFETs are used in multiple high-volume applications including automotive, telecommunications and computer applications, for example. A consequence of this is that the resultant very high manufacturing volume may provide for very low-cost components.

With low voltage switches, and potentially only two switches in a switching stage operating at a switching frequency, very high switching frequencies in the range of 1 to 10 MHz, for example, can be used with very little switching loss. This also enables a dramatic reduction in magnetic and filter component size.

This combination of features may be advantageous in respect of lower cost, lower losses, smaller sizes, and/or fewer components if integrated into a multi-die package. Although other embodiments are also possible, MOSFET-based embodiments may be particularly preferred, and are used primarily herein as illustrative examples.

A multi-stage buck power inverter as disclosed by way of example herein is intended solely for the purposes of illustration. Other types of inverters, or more generally other forms of power converters, may implement disclosed features. The present disclosure is not limited to any particular type of power converter or topology. A multi-stage power converter design may enable switching of a fraction of the voltage of a much higher voltage waveform, not only in buck inverters but also or instead in other types of power converters. Bidirectional power flow can be achieved in some embodiments, to provide true four quadrant operation.

FIG. 1 is a block diagram illustrating a power converter according to one embodiment. The example power converter 100 includes a controller 102, a multi-stage switching system 120 coupled to the controller, a filter stage 108 coupled to the multi-stage switching system, and an AC I/O stage, including power terminals 110, 114 across which an AC output 112 is provided in this example, coupled to the filter stage. The multi-stage switching system 120 includes "n" switching stages, four of which are shown at 104, 106, 116, 118. Other embodiments may include more or fewer than four switching stages.

Examples of a switching stage are described at least below with reference to FIG. 2 and FIG. 3.

Examples of a controller 102 are also described at least below, with reference to FIG. 4 and FIG. 5.

In the multi-stage switching system 120, each switching stage 104, 106, 116, 118 is coupled in a circuit path across power terminals or connections at an AC side of the power converter. An AC interconnection of the switching stages 104, 106, 116, 118 as shown in FIG. 1 may also be referred to as a cascaded, stacked, serial, or sequential interconnection of switching stages. In some embodiments, the switching stages 104, 106, 116, 118 are identical floating switching stages.

Any of various types of filters may be implemented in the filter stage 108. In general, the filter stage 108 may include one or more components such as inductors and capacitors, to smooth an AC output in the case of operating the power converter 100 as an inverter, for example. In an inverter, the filter stage 108 smooths the output of the switching stages to provide a low-noise, smooth power waveform 112 at an AC output. The filter system 108 may also provide common mode filtering to meet conducted emission requirements. Surge voltage protection may also be incorporated into the filter stage 108.

In the example power converter 100, the power terminals 110, 114 represent what is perhaps the simplest example of an I/O stage. In some embodiments, an AC I/O stage may include one or more other components. A filter stage such as 108, for example, may be considered to be part of an AC I/O stage through which an AC input is provided to the power converter 100 or an AC output is provided from the power converter.

The example power converter 100 is illustrative of an embodiment that includes multiple switching stages 104, 106, 116, 118. All of the illustrated power stages, including the switching stages 104, 106, 116, 118, the filter stage 108, and the AC I/O stage at 110, 114 may provide or support bidirectional power flow. The controller 102 in FIG. 1 is provided to control the switching stages 104, 106, 116, 118 as described in detail elsewhere herein, and may enable communications with a user interface, a utility interface, and one or more external agents such as configuration tools, logging functions, adjustment systems to change operating parameters based on weather, and so forth. A communication physical layer may be implemented as a narrowband Power Line Communication (PLC) subsystem coupled to the AC terminals 110, 114 for example. One or more levels of security may be provided for access to the controller 102.

Any of multiple power converter configurations can potentially be supported by a power converter as illustrated in FIG. 1. For example, an inverter may provide any number of AC phases, including what may be expected to be the most likely applications: single-phase (as shown), split-phase or two-phase (with two multi-stage switching systems and filter systems, including one per phase), and three-phase (with three multi-stage switching systems and filter systems, including one per phase). In general, features disclosed herein may be applied to single-phase or multi-phase power converters.

Although reference is made herein to power conversion for energy storage and PV applications, embodiments may also or instead be used in many other applications, such as audio power amplifiers, motor drivers, and ultrasonic drivers.

Figure 2:
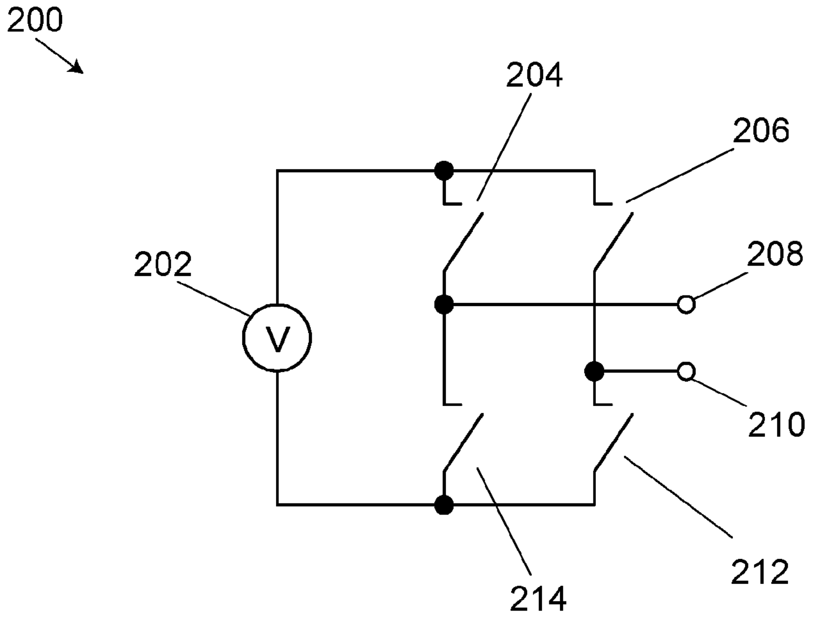
FIG. 2 is a schematic diagram illustrating an example switching stage of FIG. 1.

FIG. 2 is a schematic diagram illustrating an example switching stage, which may be implemented as a switching stage 104, 106, 116, 118 in FIG. 1 in some embodiments. The example switching stage 200 in FIG. 2 includes a voltage source 202, switches 204, 206, 212, 214, and terminals including an output terminal 208 and a reference terminal 210.

The voltage source 202 is coupled to switches 204 and 206. Switches 212 and 214 are coupled to switches 204 and

206 and to voltage source 202. Switches 204 and 214 are coupled to output terminal 208, and switches 206 and 212 are coupled to reference terminal 210. Switches 204 and 214 are switched in complementary fashion such that only one of these switches is on at any instant in time. Switches 206 and 212 are switched in complementary fashion such that only one of these switches is on at any instant in time.

Switches 206 and 212 allow reference terminal 210 to be switched to either the most positive or most negative potential at voltage source 202. This allows the output polarity to be determined by the state of switches 206 and 212.

Switches 204 and 214 allow output terminal 208 to be switched to either the most positive or most negative potential at voltage source 202. This allows the magnitude of the output potential to be substantially zero or substantially equal to the magnitude of voltage source 202.

Figure 3:
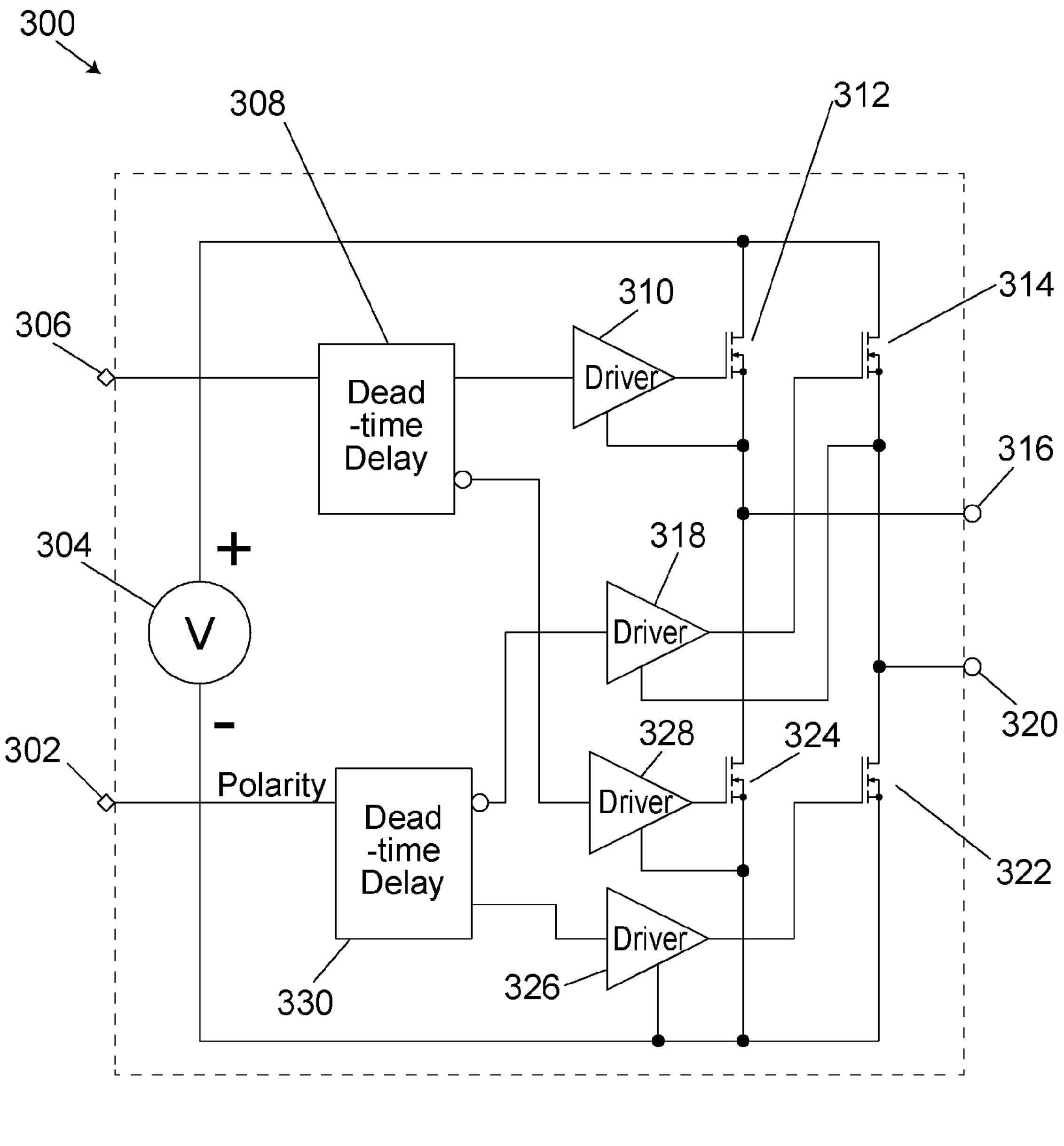
FIG. 3 is a block diagram illustrating a further example switching stage of FIG. 1.

FIG. 3 is a block diagram illustrating a further example switching stage which may be implemented as a switching stage 104, 106, 116, 118 in FIG. 1 in some embodiments. The example switching stage 300 in FIG. 3 includes a polarity control terminal 302, a voltage source 304, a drive control terminal 306, dead-time delay blocks 308, 330, driver blocks 310, 318, 326, 328, MOSFET switches 312, 314, 322, 324, and terminals including an output terminal 316 and a reference terminal 320.

The positive connection or terminal of voltage source 304 is coupled to MOSFET switches 312 and 314. MOSFET switches 322 and 324 are coupled to MOSFET switches 312 and 314 and to the negative connection or terminal of voltage source of 304. MOSFETs 314 and 322 are coupled to reference terminal 320 and are switched in a complementary fashion. MOSFET switches 312 and 324 are coupled to output terminal 316 and are switched in a complementary fashion. Driver block 310 is coupled to MOSFET 312. Driver block 318 is coupled to MOSFET 314. Driver block 328 is coupled to MOSFET 324. Driver block 326 is coupled to MOSFET 322.

Dead-time delay blocks 308 and 330 each create two outputs from one input signal, at 306, 302, respectively. The two outputs are complementary. One output is inverted with respect to the input signal. The rising edge of each output signal is delayed from the input signal. The delay may be 100 ns by way of example. This delay of the rising edges of the output signals provides a period of time during which both outputs are low and all MOSFETs 312, 314, 322, 324 are off.

A non-inverting output of dead-time delay block 308 is coupled to driver block 310. An inverting output of dead-time delay block 308 is coupled to driver block 328. A non-inverting output of dead-time delay block 330 is coupled to driver block 326. An inverting output of dead-time delay block 330 is coupled to driver block 318. Drive control terminal 306 is coupled to the input of dead-time delay block 308. Polarity control terminal 302 is coupled to the input of dead-time delay block 330.

Voltage source 304 has a positive connection or terminal (referenced herein primarily as a "connection") and a negative connection or terminal (referenced herein primarily as a "connection"). The potential of the positive connection is always substantially equal to or positive with resect to the negative connection. Voltage source 304, by way of example, may be a battery, an output of a power supply, or one output of a power supply having multiple outputs. Voltage source 304 may supply power in some examples. Voltage source 304 may absorb power in some examples. Voltage source 304 may supply power for periods of time and absorb power at other periods of time in some examples.

Drivers 310, 318, 326, 328 shift signals from dead-time delay blocks 308, 330 to a potential required to drive MOSFETs 312, 314, 322, 324 and provide suitable voltage and current capability for driving MOSFETs.

Figure 4:
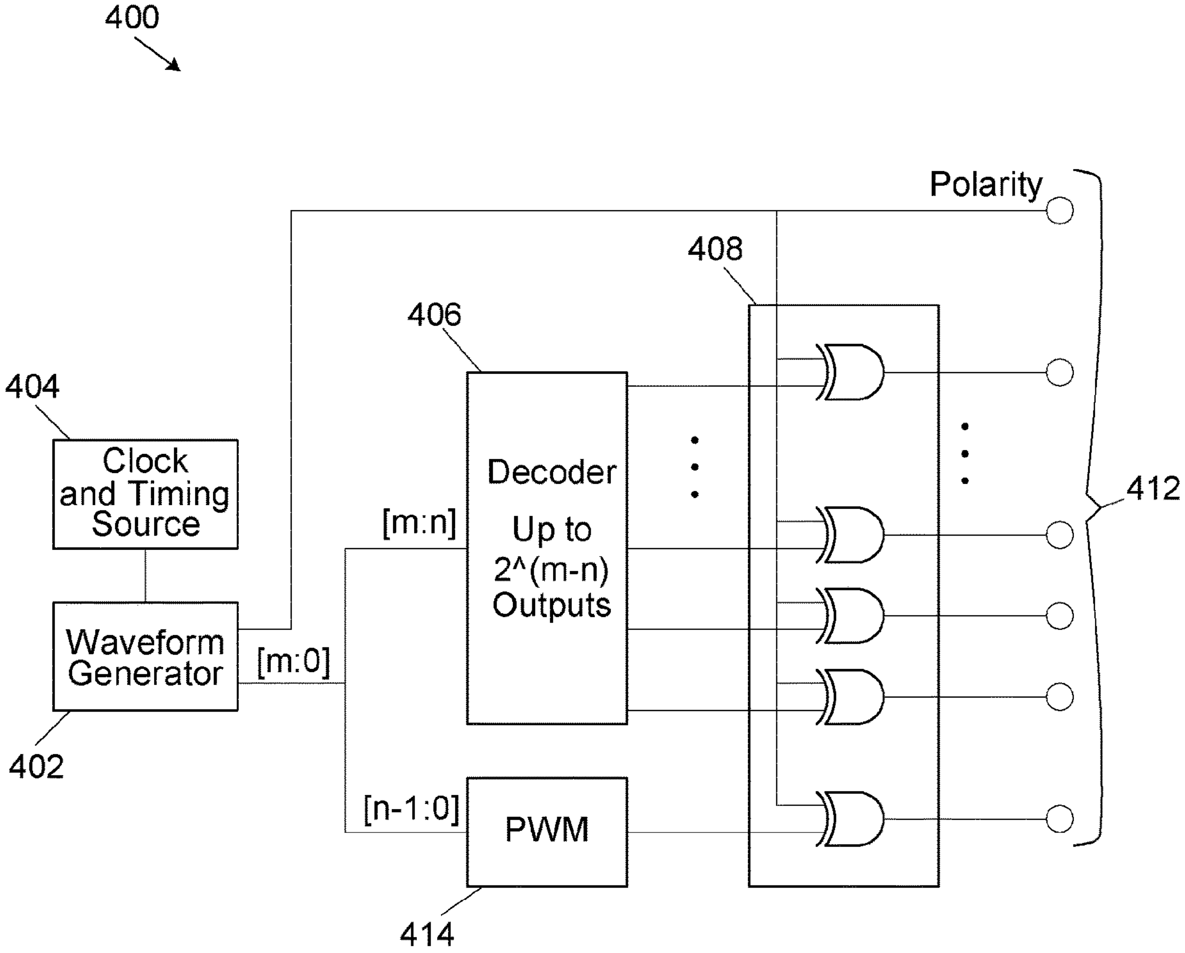
FIG. 4 is a block diagram illustrating an example controller.

FIG. 4 is a block diagram illustrating an example controller which may be implemented as the controller 102 in FIG. 1 in some embodiments. This example controller 400 includes a clock and timing source 404, a waveform generator 402, a pulse width modulation (PWM) block 414, a decoder 406, a polarity inverting block 408 (also referred to herein as a polarity inverter), and output terminals 412.

Clock and timing source 404 is coupled to waveform generator 402. Waveform generator 402 is coupled to PWM block 414 and decoder 408. A polarity output signal from waveform generator 402 is coupled to a polarity inversion block 408 and to one of the terminals at output terminals 412. Decoder 406 and a pulse width modulation signal from PWM block 414 are coupled to polarity inversion block 408. Polarity inversion block 408 is coupled to output terminals 412. Output terminals 412 are coupled to switching stages, such as switching stages 104, 106, 116, 118 of controller 102 in FIG. 1. The Polarity terminal of output terminals 412 is coupled to a polarity control terminal of each switching stage (shown by way of example at 302 in the example switching stage 300 in FIG. 3). Each of the remaining output terminals 412 is coupled to a drive control terminal (shown by way of example at 306 in FIG. 3) of a respective one of the switching stages in a multi-stage switching system such as 120 in power converter 100 in FIG. 1.

Clock and timing source 404 generates timing signals for the waveform generator 402. Clock and timing source 404 may, by way of example, use a crystal oscillator, a frequency reference from a power grid, or a timing signal from another inverter as a frequency reference.

Waveform generator 402 generates a polarity signal and a time sequence of digital words representing a desired waveform. By way of example, the desired waveform may be generated from a look up table stored in memory or by calculating points of the desired waveform from a mathematical equation.

A digital word representing a point in the desired waveform, as generated by the waveform generator 402, may be parsed into a group of least significant bits that drive the PWM block 414. The remaining most significant bits drive decoder 406. PWM block 414 generates a pulse width modulated output from its portion of the digital word.

Decoder 406 decodes the remaining most significant bits to generate drive signals. The polarity of pulse with modulated output from the PWM block 414 and the drive signals from decoder 406 is controlled by polarity inversion block 408. Polarity inversion block 408 either passes decoder and PWM block output signals through unchanged or inverts them depending on the polarity signal from waveform generator 402. The polarity signal from waveform generator 402 and the output signal from polarity inversion block 408 at output terminals 412 control the switching stages in a multi-stage switching system, such as the system 120 in FIG. 1.

In one embodiment of the multi-stage switching system 120 in FIG. 1, voltage sources 304 in switching stages 300 (FIG. 1) are all substantially equal. In this embodiment decoder 406 in FIG. 4 decodes 2^(m−n) outputs corresponding to each value of the m:n digital word.

In another embodiment of the multi-stage switching system 120 in FIG. 1, voltage sources 304 in switching stages 300 (FIG. 3) progress in amplitude in a binary sequence such that each subsequent voltage source 304 is twice the amplitude of the previous. In this embodiment decoder 406 in FIG. 4 provides m−n outputs corresponding to each bit magnitude of the m:n digital word.

Figure 5:
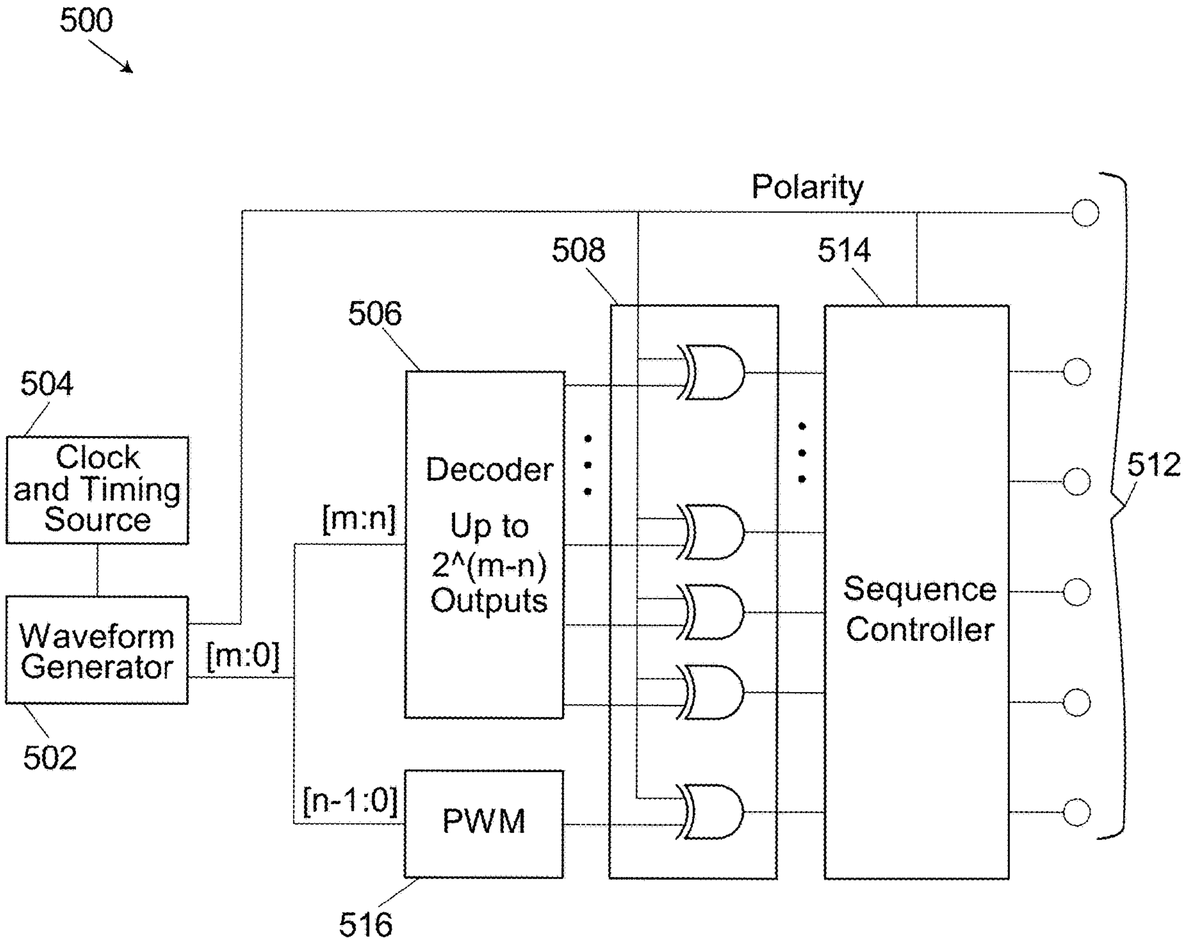
FIG. 5 is a block diagram illustrating an example controller according to another embodiment.

FIG. 5 is a block diagram illustrating a further example controller which may be implemented as the controller 102 in FIG. 1 in some embodiments. This example controller 500 includes a clock and timing source 504, a waveform generator 502, a PWM block 516, a decoder 506, a polarity inverting block 508, a sequence controller 514, and output terminals 512.

Clock and timing source 504 is coupled to waveform generator 502. Waveform generator 502 is coupled to PWM block 516 and decoder 506. A polarity output signal from waveform generator 502 is coupled to a polarity inversion block 508, to sequence control 514 and to one of the terminals at output terminals 512. Decoder 506 and the pulse width modulation signal from PWM block 516 is coupled to polarity inversion block 508. Polarity inversion block 508 is coupled to sequence controller 514. Sequence controller 514 and the polarity signal from waveform generator 502 are coupled to output terminals 512. Output terminals 512 are coupled to switching stages, such as switching stages 104, 106, 116, 118 of controller 102 in FIG. 1.

In one embodiment sequence controller 514 changes the order of drive outputs at output terminals 512, such that each drive output from polarity inverting block 514 drives a different switching stage over a sequence of (m−n) half periods of the polarity signal.

In a further embodiment sequence controller 514 changes the order of drive outputs at output terminals 512 randomly, such that each drive output from polarity inverting block 514 drives a different switching stage every half period of the polarity signal.

Figure 6:
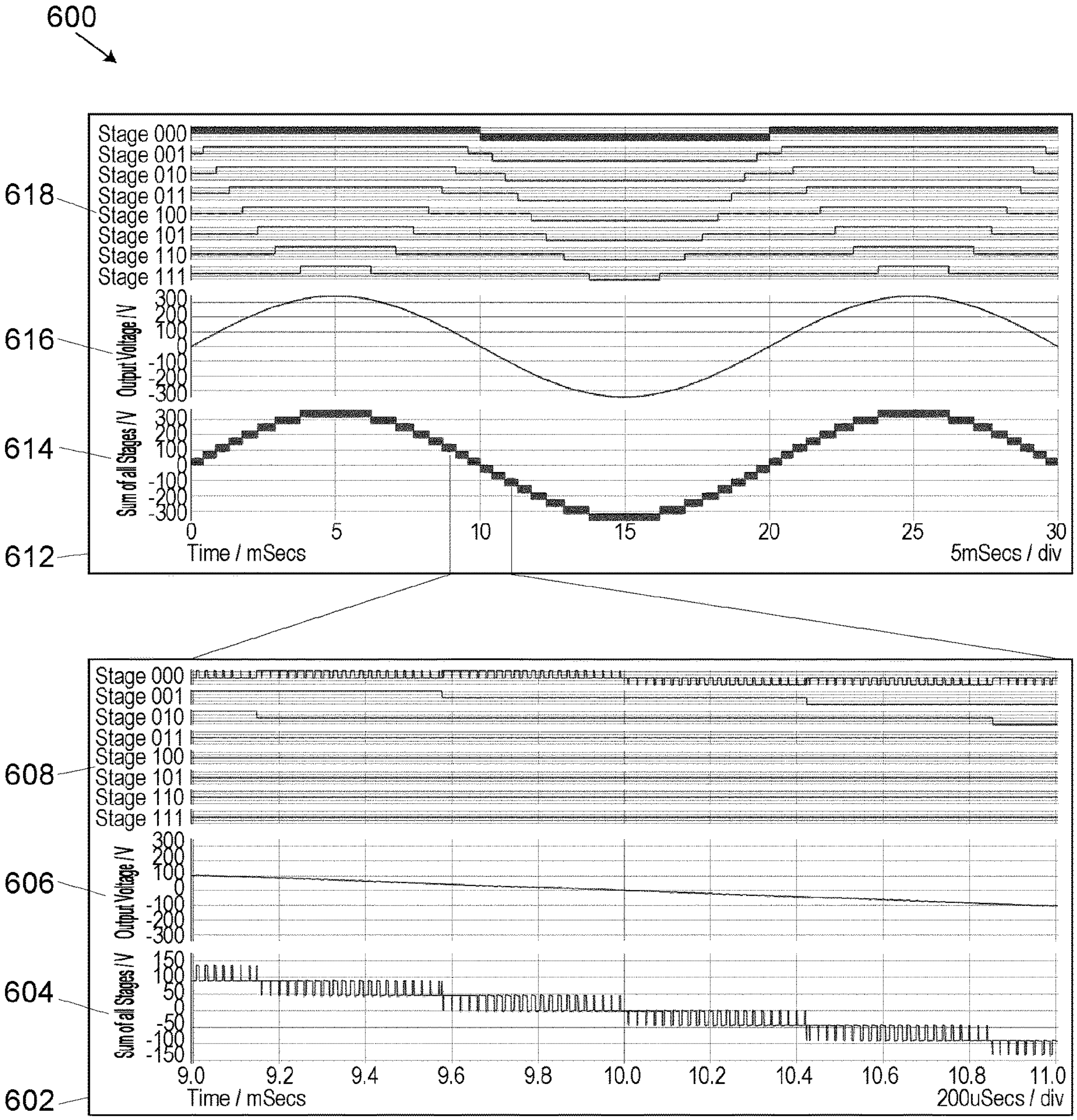
FIG. 6 includes plots of per-stage and AC output voltage versus time for an example single-phase eight-stage inverter.

FIG. 6 includes plots of per-stage and AC output voltage versus time for an example single-phase eight-stage inverter consistent with FIG. 1. Waveform plot 600 in FIG. 6 includes waveform set 602 and waveform set 612. Waveform set 602 includes grid 608 showing voltage waveforms at the output of each of eight stages of the multi-stage switching system 120 of FIG. 1, waveform 604 illustrating a sum of all stages, and output voltage waveform 606. Waveform set 612 includes grid 618 showing voltage waveforms at the output of each of eight stages of the multi stage switching system 120 in FIG. 1, waveform 614 illustrating a sum of all stages and output voltage waveform 616. Waveform set 612 shows the waveforms on a time scale of three cycles at 50 Hz. Waveform set 602 shows the same waveforms on a time scale of 2 ms centred around the zero-crossing voltage of output voltage waveform 616. The pulse width modulation frequency of stage 000 is 50 KHz. This allows individual switching pulses to be seen on the time scale of waveform set 602.

The grids 608, 618 in FIG. 6 show voltage waveforms for each switching stage, at terminals 208 and 210 of FIG. 2 and similarly at terminals 316 and 320 in FIG. 3, for example. The eight stages in the example shown in FIG. 6 are labeled Stage 000 through Stage 111 in a binary sequencer of eight stages. By way of example, each of these eight stages switches between 0 and 50V during positive half cycles of the AC output, from 0 to 10 ms and from 20 to 30 ms in the waveform set 612 in FIG. 6, and switches between 0 and −50V during negative half cycles of the AC output, one of which is from 10 to 20 ms in the waveform set 612 in FIG. 6.

The waveform labelled stage 000 in grids 618 and 608 of FIG. 6 is a switching waveform with frequency, by way of example, of 50 kHz. In an embodiment, this waveform is pulse width modulated by PWM block 414 in FIG. 4, with pulse width determined by the lower n bits of the digital word generated by waveform generator 402 in FIG. 4.

For the controller 400 as shown in FIG. 4, as the value of the n bits driving PWM block 414 range from zero to 2^(n−1) the pulse width generated by PWM block 414 ranges from zero to 100% duty.

If the output of the waveform generator 402 is increasing and the duty of the PWM block 414 reaches 100% the upper bits of the word generated by waveform generator 402 increment and the lower n bits roll over to zero. Decoder 406 decodes the upper word formed by the m to n bit range into drive signals for the remaining stages of multi-stage switching system 120 of FIG. 1. This results in one of the other switching stages switching from a state of zero to one and PWM block 414 going from 100% to 0% duty.

If the output of the waveform generator 402 is decreasing and the duty of the PWM block 414 reaches 0% the upper bits of the word generated by waveform generator 402 decrement and the lower n bits roll under to all be 1. This results in one of the other switching stages switching from a state of one to zero and PWM block 414 going from 0% to 100% duty.

As is perhaps most clearly visible from the grid 618 at the top of FIG. 6, Stage 001 through Stage 111 switch sequentially as the output of waveform generator 402 changes. The output of multi-stage switching system 120, for example at the input of filter stage 106 in FIG. 1, is shown at 604, 614, and the waveform at output terminals 110 and 114 in FIG. 1 is shown at 606, 616. The output of multi-stage switching system 120, at the input of filter stage 108 in FIG. 1, is a superposition of the waveforms of eight stages, Stage 000 through Stage 111. The filter stage 108 filters and averages this waveform to produce a smooth curve at 112 in FIG. 1.

Figure 7:
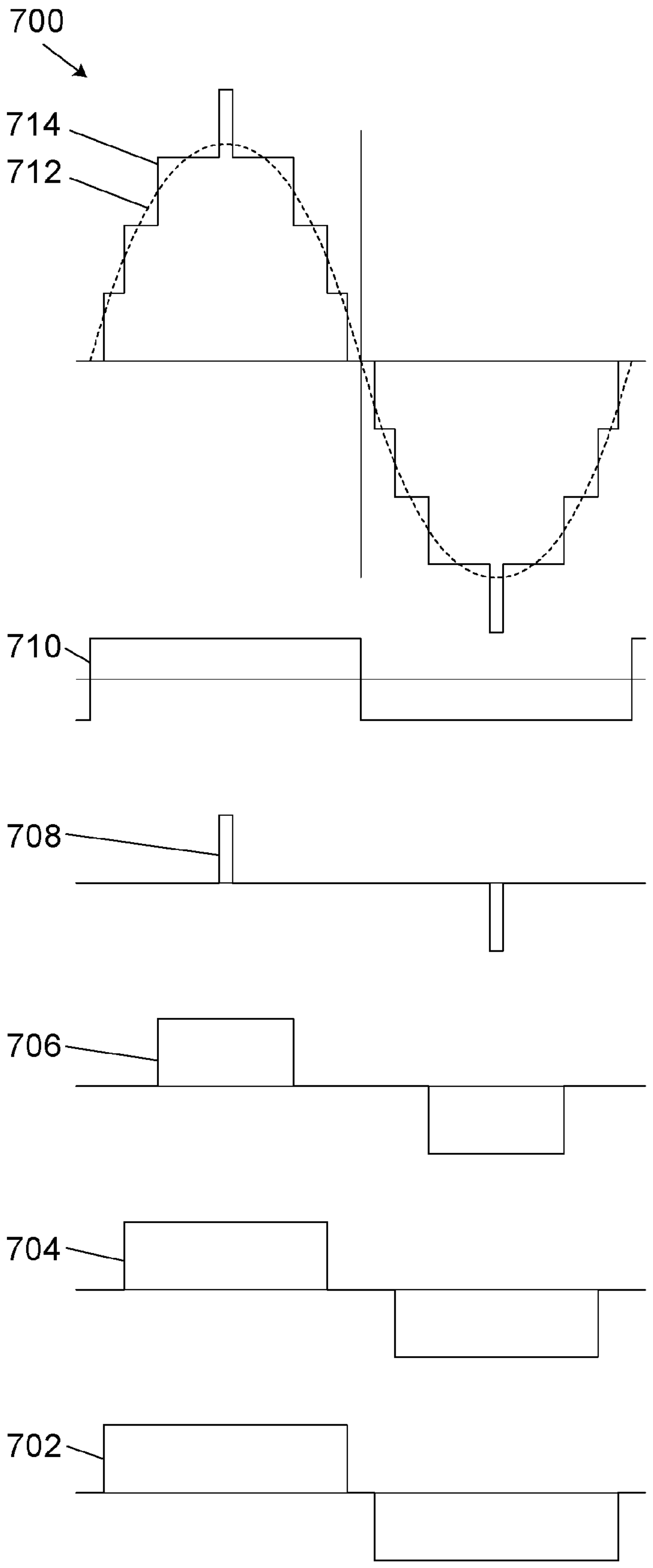
FIG. 7 includes plots of per-stage and AC output voltage versus time for a conventional single-phase four-stage Inverter.

FIG. 7 includes plots of per-stage and AC output voltage versus time for a conventional single-phase four-stage Inverter. This includes a polarity waveform 710, a first stage waveform 702, a second stage waveform 704, a third stage waveform 706, and a fourth stage waveform 708. The resulting output waveform 714 is the product of the polarity waveform 710 and the summation of waveforms 702, 704, 706 and 708. Waveform 712 shows the target sine wave which is approximated by output waveform 714.

Figure 8:
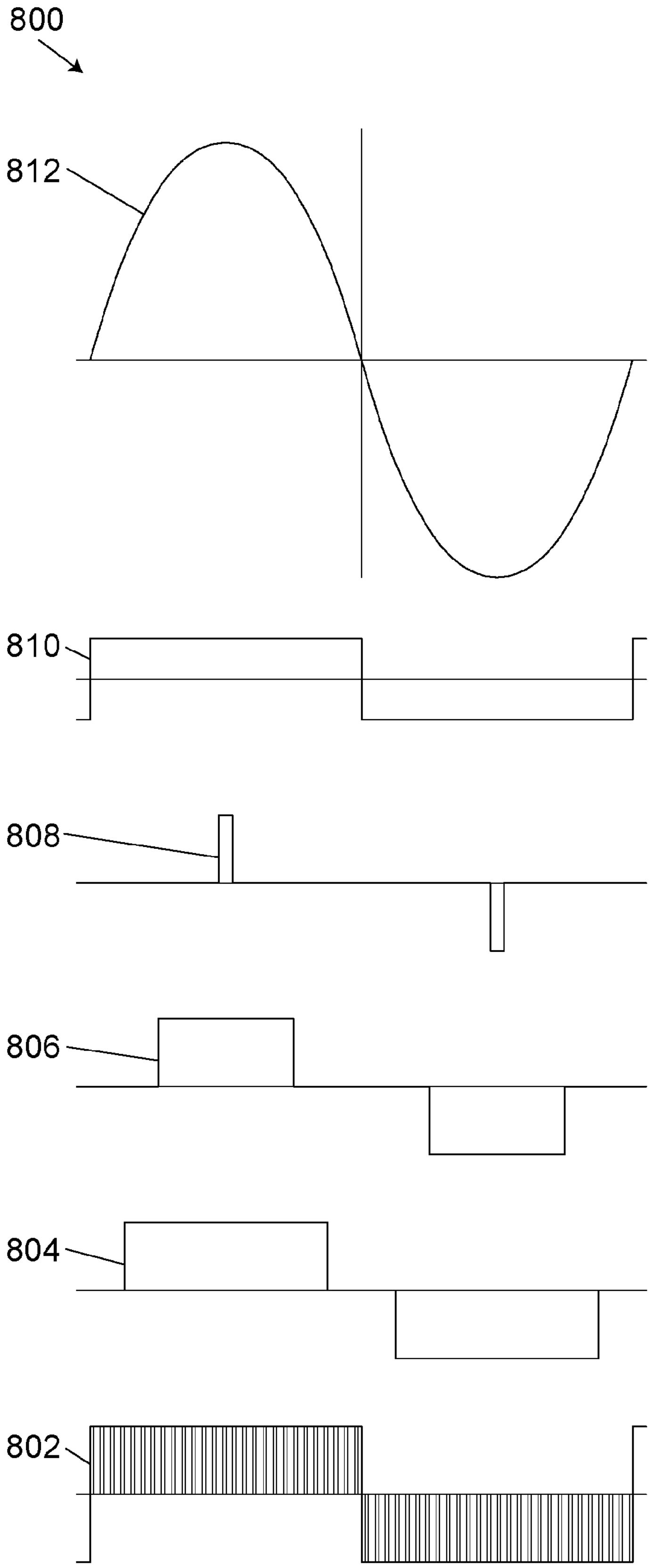
FIG. 8 includes plots of per-stage and AC output voltage versus time for an example single-phase four-stage inverter according to an embodiment.

FIG. 8 includes plots of per-stage and AC output voltage versus time for an example single-phase four-stage inverter according to an embodiment, and shows waveforms of example power converter 100 of FIG. 1, operated as an inverter and configured with four switching stages. Waveforms 802, 804, 806, 808 show waveforms of the four stages of a multi-stage switching system 120 of FIG. 1. Waveform 802 shows the PWM switching waveform. Waveform 810 shows the polarity signal. Waveforms 802, 804, 806 and 808 are summed and filtered to generate output waveform 812.

Figure 9:
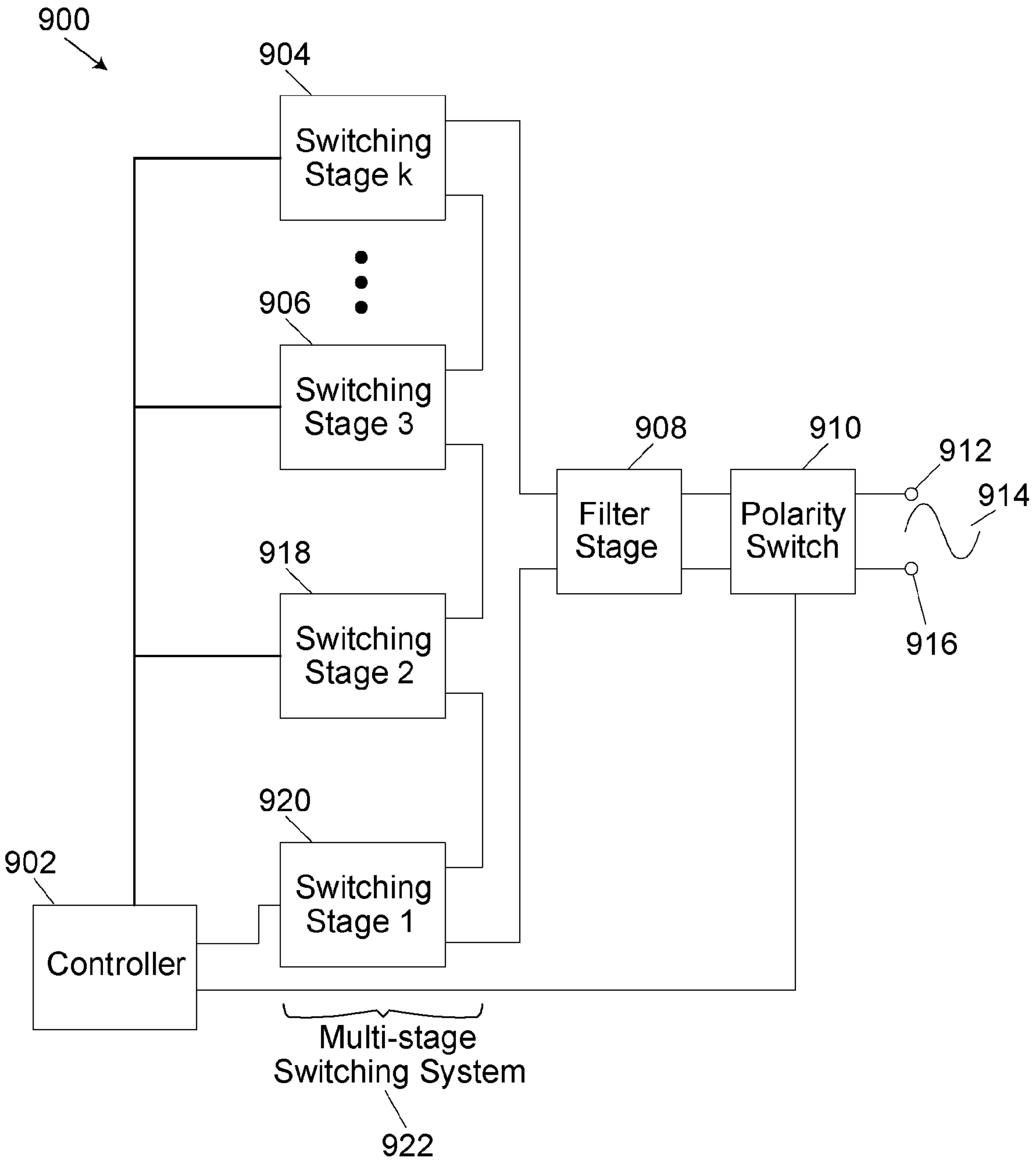
FIG. 9 is a block diagram illustrating a power converter according to another embodiment.

FIG. 9 is a block diagram illustrating a power converter 900, in particular an inverter, according to another embodiment. FIG. 9 includes a controller 902, switching stages 904, 906, 918, 920 of a multi-stage switching system 922, a filter stage 908, a polarity switch 910, output terminals 912 and 916 and output waveform 914. FIG. 9 differs from FIG. 1 in that a polarity signal is provided by the controller 902 to the polarity switch 910 in FIG. 9 instead of to each switching stage in FIG. 1.

Figure 10:
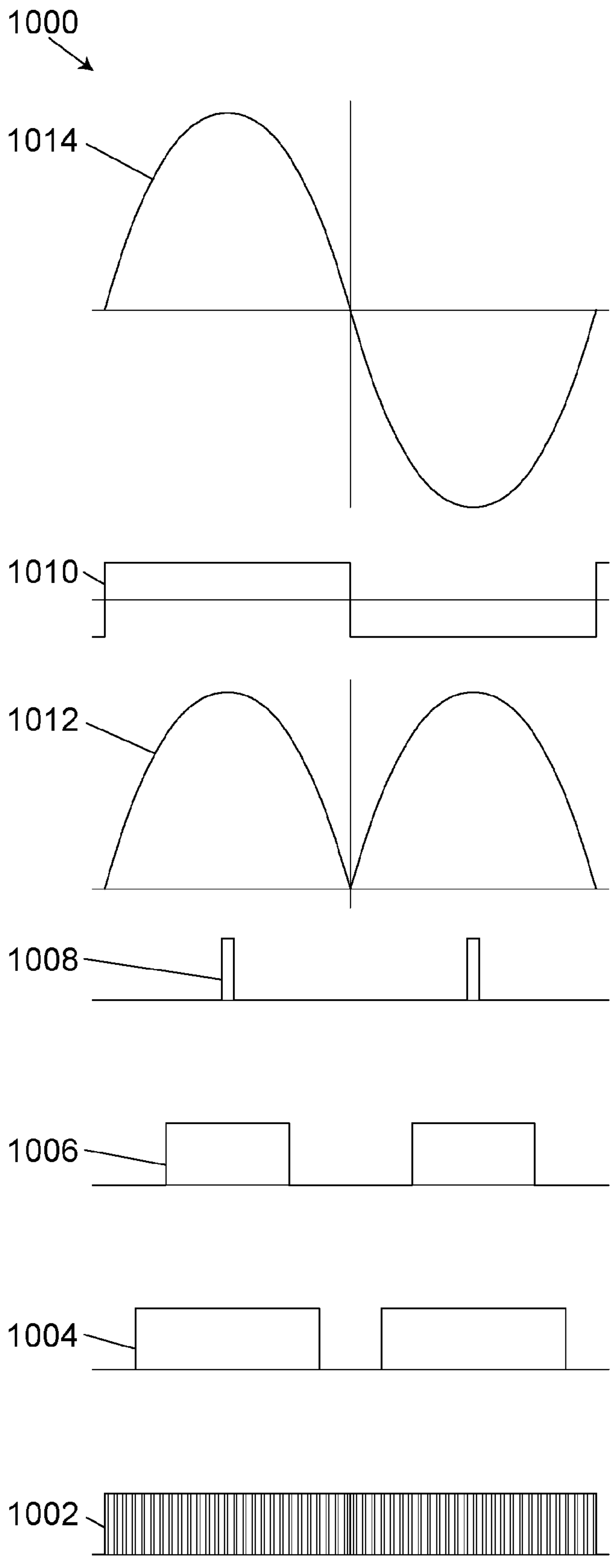
FIG. 10 includes plots of per-stage and AC output voltage versus time for an example single-phase four-stage inverter as illustrated in FIG. 9.

FIG. 10 shows a waveform illustration 1000 that includes plots of per-stage and AC output voltage versus time for an example single-phase four-stage inverter as illustrated in FIG. 9. Waveform illustration 1000 includes switching stage waveform 1002, switching stage waveform 1004, switching stage waveform 1006, switching stage waveform 1008, filter stage output waveform 1012, polarity waveform 1010 and output waveform 1014. These waveforms are an example of waveforms of inverter 900 in FIG. 9.

Figure 11:
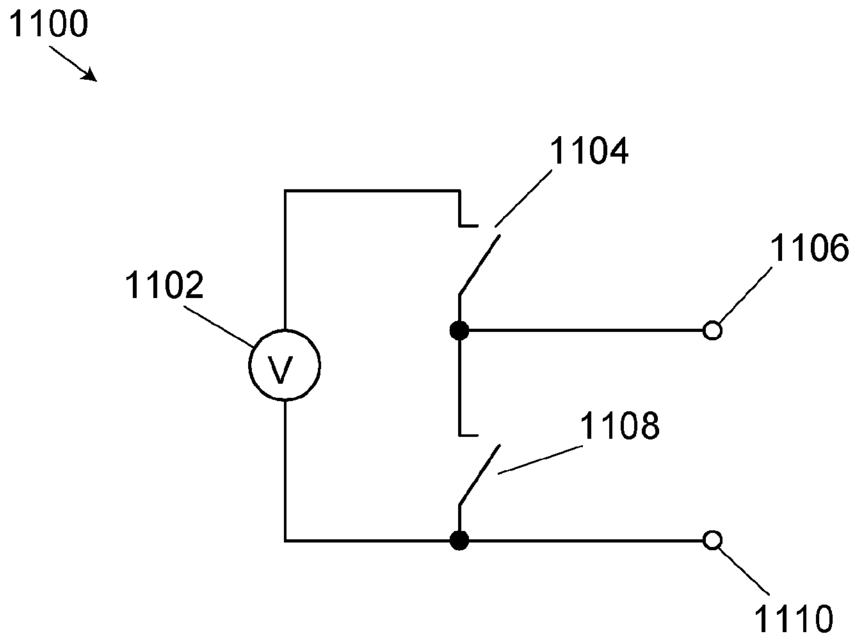
FIG. 11 is a schematic diagram illustrating an example switching stage of FIG. 9.

FIG. 11 is a schematic diagram illustrating an example switching stage of multi-stage switching system 922 in FIG. 9. FIG. 11 depicts switching stage 1100. Switching stage 1100 includes a voltage source 1102, a switch 1104, a switch 1108, and terminals including an output terminal 1106 and an output reference terminal 1110. Voltage source and switch implementation examples provided above with reference to FIG. 2, or elsewhere herein, also apply to FIG. 11.

Switch 1104 and switch 1108 are driven in complement such that when one switch is on the other switch is off. When switch 1104 is on and switch 1108 is off, output terminal 1106 is at the potential of voltage source 1102 with respect to output reference terminal 1110. When switch 1104 is off and switch 1108 is on output terminal 1106 is at the potential of output reference terminal 1110. This results in 0 V out.

Figure 12:
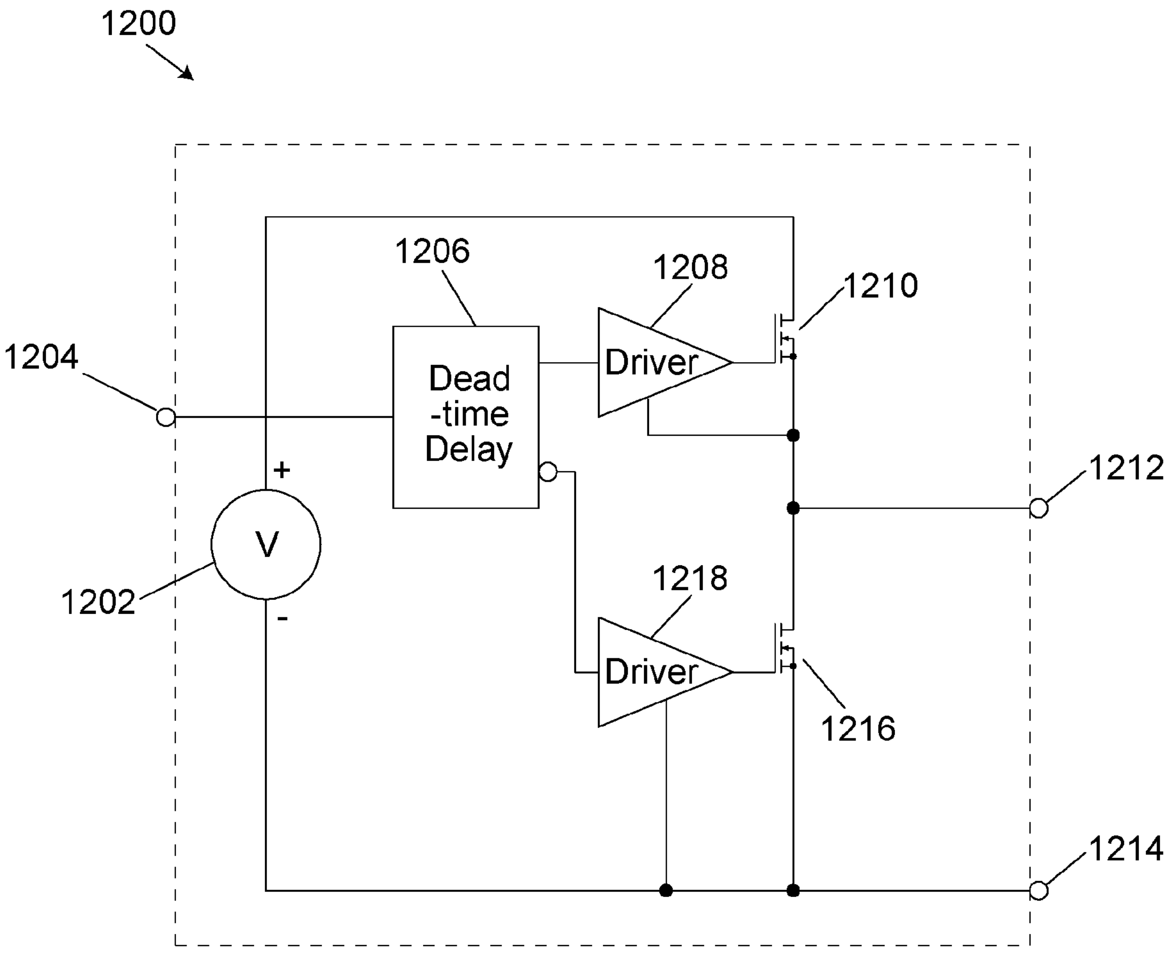
FIG. 12 is a block diagram illustrating a further example switching stage of FIG. 9.

FIG. 12 is a block diagram illustrating a further example switching stage of multi-stage switching system 922 of FIG. 9. FIG. 12 shows switching stage 1200. Switching stage 1200 includes a voltage source 1202, an input control terminal 1204, a dead-time delay block 1206, a driver 1208, a driver 1218, a MOSFET switch 1210, a MOSFET switch 1216, and terminals including an output terminal 1212 and an output reference terminal 1214. Input control terminal 1204 receives a signal from controller 902 in FIG. 9. Implementation examples provided above with reference to FIG. 3, or elsewhere herein, also apply to FIG. 12.

Figure 13:
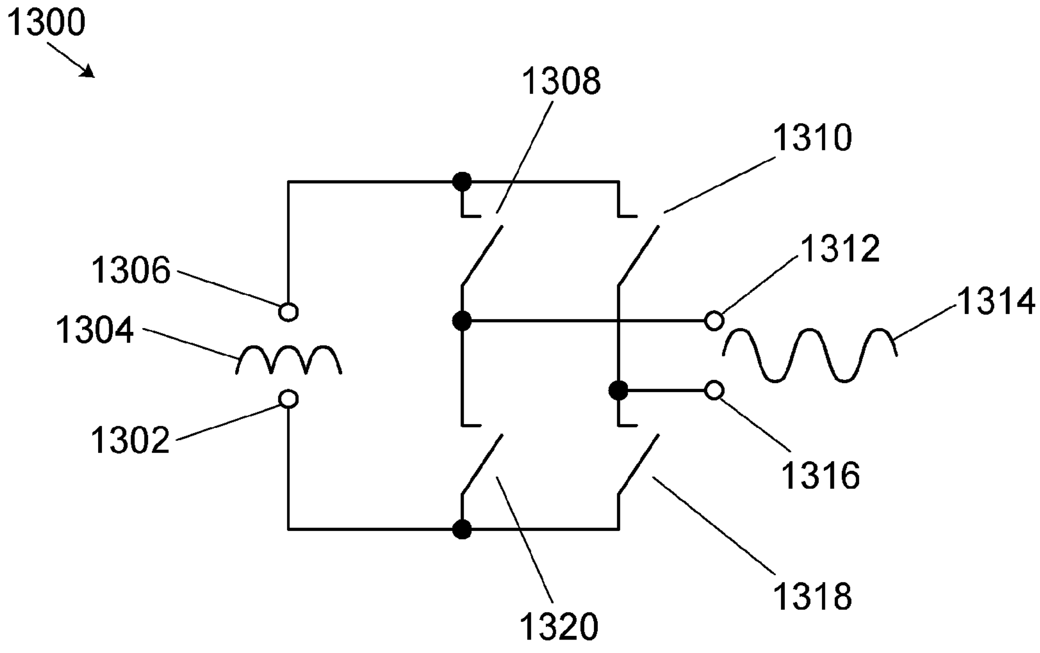
FIG. 13 is a schematic diagram illustrating an example polarity switch as shown in FIG. 9.

FIG. 13 is a schematic diagram illustrating an example polarity switch 1300, as an example of polarity switch 910 in FIG. 9. FIG. 13 includes an input terminal 1302, an input terminal 1306, an input waveform 1304, a switch 1308, a switch 1320, a switch 1310, a switch 1318, output terminal 1312 and an output terminal 1316, and an output waveform 1314. Switch implementation examples provided above with reference to FIG. 2, or elsewhere herein, also apply to FIG. 13.

Switch 1308 and switch 1318 are controlled such that they are on at the same time and off at the same time. Switch 1310 and switch 1320 are controlled such that they are on at the same time and off at the same time. Switch 1308 and switch 1310 are controlled in a complementary fashion such that one is on, and the other is off and vice versa. Switch 1318 and switch 1320 are controlled in a complementary fashion such that one is on, and the other is off and vice versa. This complementary control of the two sets of switches provides a means to apply the input voltage from one of the input terminals to either of the output terminals and to apply the input voltage from the other of the input terminals to the other of the output terminals. This provides a means to switch input waveform 1304 to the output terminals such that the polarity is inverted during every other period of input waveform 1304.

Figure 14:
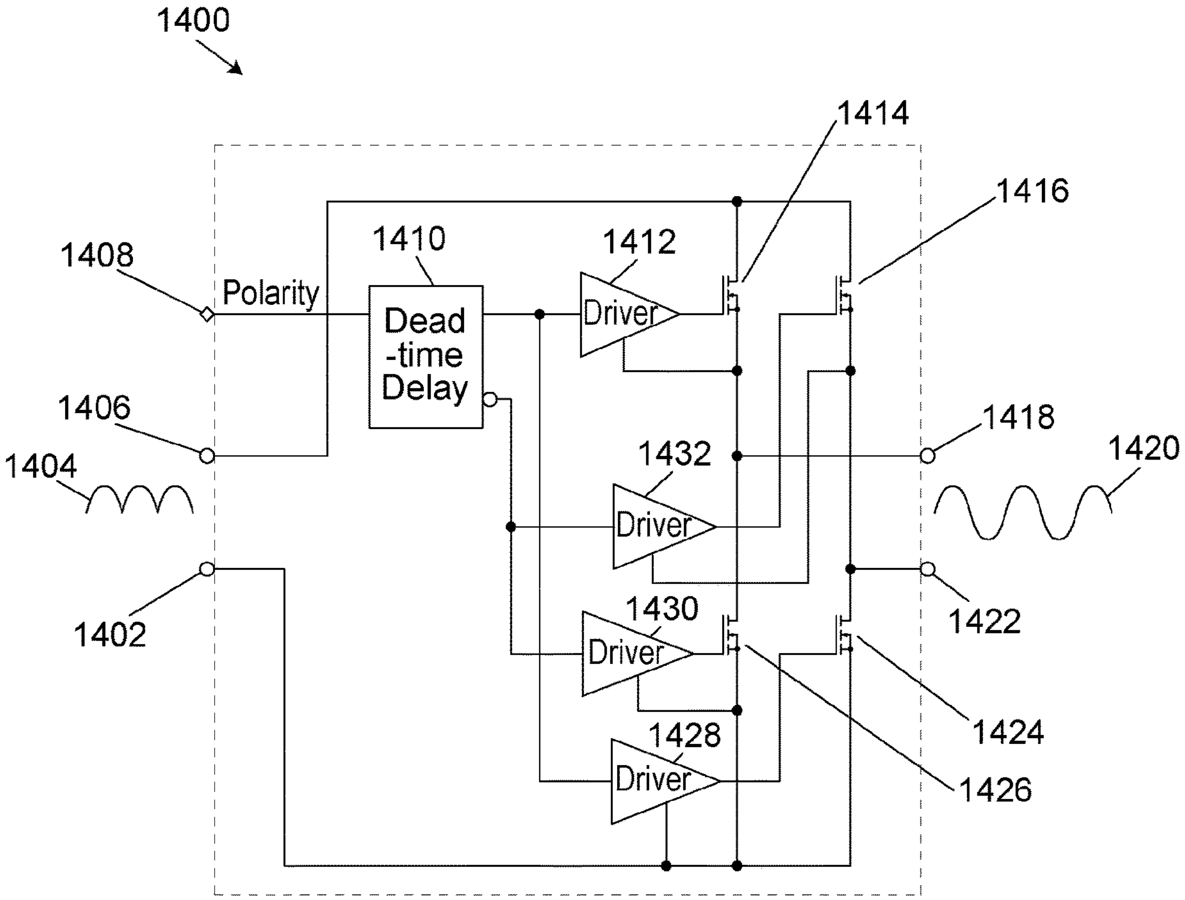
FIG. 14 is a block diagram illustrating a further example polarity switch as shown in FIG. 9.

FIG. 14 is a block diagram illustrating a further example of a polarity switch 1400, as an example of polarity switch 910 in FIG. 9. Polarity switch 1400 includes an input terminal 1402, an input terminal 1406, a polarity control signal terminal 1408, a dead-time delay block 1410, a driver 1412, a driver 1428, a driver 1430, a driver 1432, a MOSFET switch 1414, a MOSFET switch 1416, a MOSFET switch 1424, a MOSFET switch 1426, and terminals including an output terminal 1418 and an output terminal 1422. FIG. 14 also shows an input waveform 1404 and an output waveform 1420. Implementation examples provided above with reference to FIG. 3, or elsewhere herein, also apply to FIG. 14.

Figure 15:
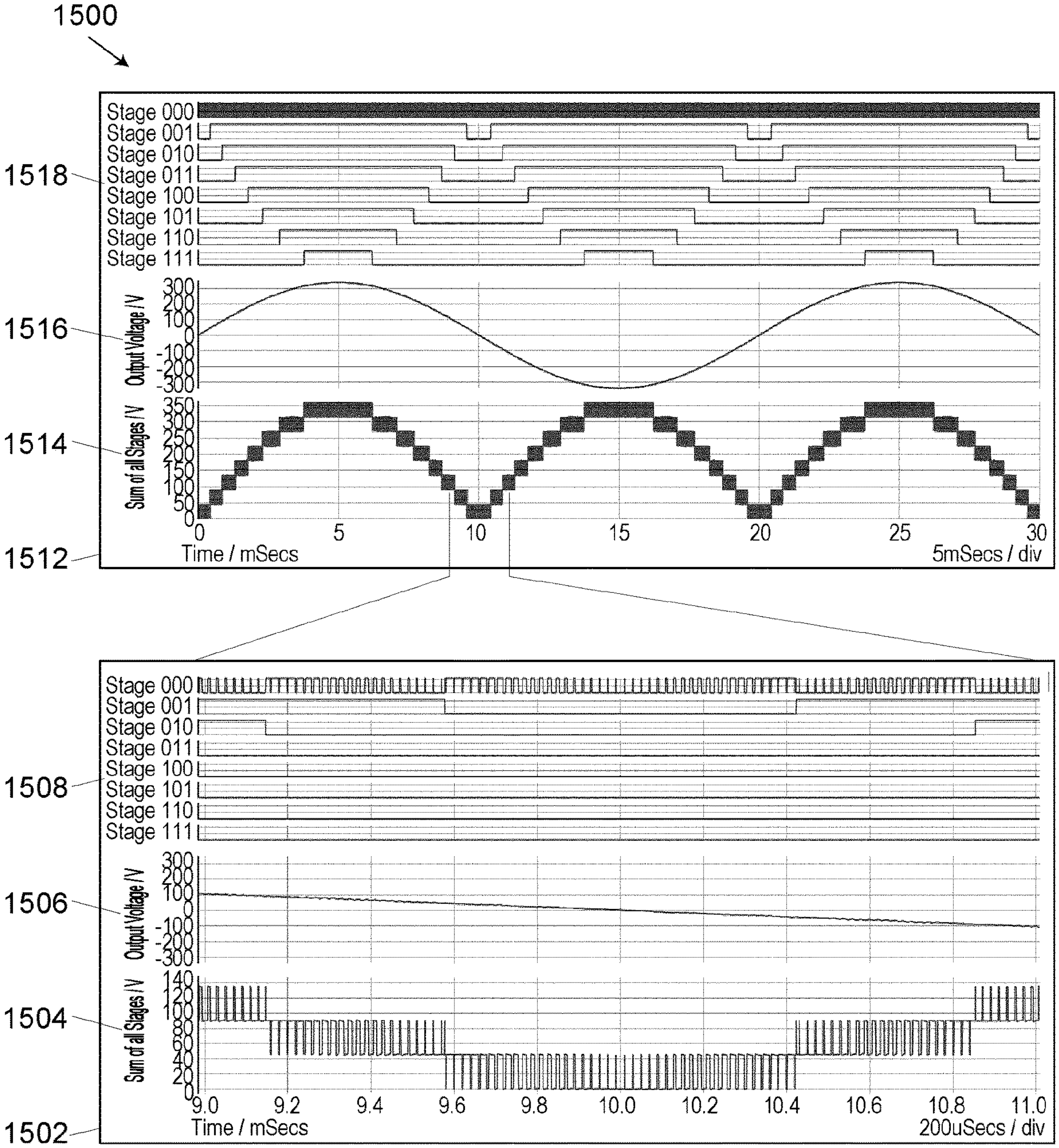
FIG. 15 includes plots of per-stage and switching output voltage versus time for another example single-phase eight-stage inverter.

FIG. 15 includes plots of per-stage and switching output voltage versus time for an example single-phase eight-stage inverter consistent with the example inverter 900 as shown in FIG. 9. Waveform plot 1500 in FIG. 15 includes waveform set 1502 and waveform set 1512. Waveform set 1502 includes grid 1508 showing voltage waveforms at the output of each of eight stages of the multi-stage switching system 920 of FIG. 9, waveform 1504 illustrating a sum of all stages, and output voltage waveform 1506. Waveform set 1512 includes grid 1518 showing voltage waveforms at the output of each of eight stages of the multi stage switching system 920 in FIG. 9, waveform 1514 illustrating a sum of all stages and output voltage waveform 1516. Waveform set 1512 shows the waveforms on a time scale of three cycles at 50 Hz. Waveform set 1502 shows the same waveforms on a time scale of 2 ms centred around the zero-crossing voltage of output voltage waveform 1516. The pulse width modulation frequency of stage 000 is 50 KHz. This allows individual switching pulses to be seen on the time scale of waveform set 1502.

The grids 1508, 1518 in FIG. 15 show voltage waveforms for each switching stage, at terminals 1106 and 1110 of FIG. 11 and similarly at terminals 1212 and 1214 in FIG. 12, for example. The eight stages in the example shown in FIG. 15 are labeled Stage 000 through Stage 111 in a binary sequencer of eight stages. By way of example, each of these eight stages switches between 0 and 50V in the waveform set 1512 in FIG. 15, and switches between 0 and −50V during negative half cycles of the AC output, one of which is from 10 to 20 ms in the waveform set 1512 in FIG. 15.

The waveform labelled stage 000 in grids 1518 and 1508 of FIG. 15 is a switching waveform with frequency, by way of example, of 50 kHz. In an embodiment, this waveform is pulse width modulated by PWM block 414 in FIG. 4, with pulse width determined by the lower n bits of the digital word generated by waveform generator 402 in FIG. 4.

For the controller 400 as shown in FIG. 4, as the value of the n bits driving PWM block 414 range from zero to 2^(n−1) the pulse width generated by PWM block 414 ranges from zero to 100% duty.

If the output of the waveform generator 402 is increasing and the duty of the PWM block 414 reaches 100% the upper bits of the word generated by waveform generator 402 increment and the lower n bits roll over to zero. Decoder 406 decodes the upper word formed by the m to n bit range into drive signals for the remaining stages of multi-stage switching system 920 of FIG. 9. This results in one of the other switching stages switching from a state of zero to one and PWM block 414 going from 100% to 0% duty.

If the output of the waveform generator 402 is decreasing and the duty of the PWM block 414 reaches 0% the upper bits of the word generated by waveform generator 402 decrement and the lower n bits roll under to all be 1. This results in one of the other switching stages switching from a state of one to zero and PWM block 414 going from 0% to 100% duty.

As is perhaps most clearly visible from the grid 1518 at the top of FIG. 15, Stage 001 through Stage 111 switch sequentially as the output of waveform generator 402 changes. The output of multi-stage switching system 920, for example at the input of filter stage 908 in FIG. 9, is shown at 1504, 1514, and the waveform at output terminals 912 and 916 in FIG. 9 is shown at 1506, 1516. The output of multi-stage switching system 920, at the input of filter stage 908 in FIG. 9, is a superposition of the waveforms of eight stages, Stage 000 through Stage 111. Filter stage 908 filters and averages this waveform to produce a smooth curve at the input of polarity switch 910 in FIG. 9. Polarity switch 910 in FIG. 9 switches polarity when the polarity signal at output terminals 412 in Fig, 4 switches polarity to generate AC waveform 914.

Embodiments disclosed herein encompass an apparatus that includes power connections or terminals, which may be more generally referred to as power interfaces. In an embodiment, an apparatus includes a first power interface and a second power interface.

A multi-stage switching system is coupled to the first power interface and to the second power interface, and includes switching stages to convert between DC power at the first power interface and AC power at the second power interface. Converting between DC power and AC power may be in either direction, and a switching system may support bidirectional power conversion. The switching stages are coupled together in a circuit path across the second (AC) power interface.

This general structure is shown by way of example in FIGS. 1 and 9, each of which illustrates a multi-stage switching system 120, 922, with switching stages coupled together in a circuit path across an AC power interface to filter stages 108, 908. DC power interfaces are not visible FIGS. 1 and 9, but are shown generally in FIGS. 2, 3, 11, and 12 as connections to voltage sources.

FIGS. 1 and 9 also each illustrate a controller 102, 902, coupled to a multi-stage switching system, to control switching in one of the switching stages at high frequency relative to a frequency of the AC power, and to control switching of another one of the switching stages, or each of the other switching stages, at a lower frequency relative to the frequency of the AC power. Different switching frequencies are shown by way of example in FIGS. 6 and 15, wherein Stage 000 switching frequency is higher than the switching frequency of all other switching stages. The lower frequency at which other switching stages are switched is twice the frequency of the AC power in some embodiments, with each switch other than switches in the high frequency switching stage being turned on once and turned off once in each half cycle.

Apparatus consistent with the present disclosure may include other components, such as a filter stage, coupled to the second power interface, to filter the AC power at the second power interface. A filter stage 108, 908 is shown by way of example in each of FIGS. 1 and 9.

The example shown in FIG. 1 is illustrative of an embodiment in which each switching stage includes a polarity switching stage to control polarity of the AC power at the AC power interface. Polarity switching or control is within each switching stage.

In the example shown in FIG. 9, however, the polarity switch 910 is an example of a polarity switching stage that is coupled to the second power interface, to control polarity of the AC power at the AC power interface.

Switching stages may be identical in structure, or otherwise designed, controlled, or configured to each handle approximate the same voltage. For inverter operation, for example, each switching stage may be configured to provide an equal fraction, or approximately equal fraction, of voltage of the AC power. In some embodiments, the degree of matching of voltage from stage to stage, to be approximately equal, should be within one least significant control bit. For example, if 5 bits are used to control the PWM and the applied stage voltage is 50V, then variation in voltage from stage to stage should be less than 50V/32=1.5V.

The controller may operate the switching stages, to provide respective output voltages in inverter applications for example, in sequential order in which the switching stages are coupled in the circuit path across the second power interface. With identical switching stages, however, order of operation is less important, and the controller may operate the switching stages to provide respective output voltages out of sequential order in which the switching stages are coupled in the circuit path across the second power interface.

For example, an order in which the controller is configured to operate the switching stages to provide respective output voltages may vary between half cycles of the AC power, such that any individual switching stage is on and provides an output voltage for different periods of time in a sequence of half cycles and is to be switched at the high frequency in one of those half cycles in the sequence. In another embodiment an order in which the controller is configured to operate the switching stages to provide respective output voltages is randomized.

Other embodiments are also possible. For example, a controller that is coupled to a multi-stage switching system may control switching in the switching stages based on a digital word that includes m bits. The controller may be configured to generate a PWM output based on n least significant bits of the digital word to control switching in one of the switching stages (e.g. Stage 000 in FIGS. 6 and 15), and to generate further outputs based on (m−n) most significant bits of the digital word to control switching in other switching stages.

Such a controller may include a waveform generator, as shown by way of example in FIGS. 4 and 5, to generate the digital word.

FIGS. 4 and 5 also illustrate examples of a controller that includes a PWM block to receive the n least significant bits of the digital word and to generate the PWM output.

The example controllers in FIGS. 4 and 5 each include a decoder to receive the (m−n) most significant bits of the digital word and to generate the further outputs.

A polarity inverter to control polarity of the PWM output and the further outputs is also shown in FIGS. 4 and 5.

The example controller in FIG. 5 includes a sequence controller 514 to control an order in which the PWM output and the further outputs are provided to the switching stages, relative to an order in which the switching stages are coupled in the circuit path across the second power interface. As described herein, at least above, the order in which the PWM output and the further outputs are provided to the switching stages may be in order, or out of the order, in which the switching stages are sequentially coupled in the circuit path across the second power interface. For example, the order in which the PWM output and the further outputs are provided to the switching stages may vary between half cycles of the AC power, and/or may be randomized.

Considering the example controllers in FIGS. 4 and 5 as a whole, a controller may include a combination of the illustrated components. In an embodiment, a controller includes a PWM block 414, 516 coupled to the waveform generator 402, 502 to receive the n least significant bits of the digital word and to generate the PWM output; a decoder 406, 506 coupled to the waveform generator to receive the (m−n) most significant bits of the digital word and to generate the further outputs; and a polarity inverter 408, 508 coupled to the waveform generator, to the PWM block, and to the decoder. The waveform generator 402, 502 is further configured to generate a polarity control bit, and the polarity inverter 408, 508 is configured to receive the polarity control bit and to control polarity of the PWM output and the further outputs based on the polarity control bit.

In the example controller of FIG. 5, the sequence controller 514 is coupled to the waveform generator 502 to the polarity inverter 508, to receive the polarity control bit and to control an order in which the PWM output and the further outputs are provided to the switching stages, relative to an order in which the switching stages are coupled in the circuit path across the second power interface, based on the polarity control bit.

Other features disclosed herein may also or instead be provided, independently or in any of various combinations, in apparatus embodiments.

Figure 16:
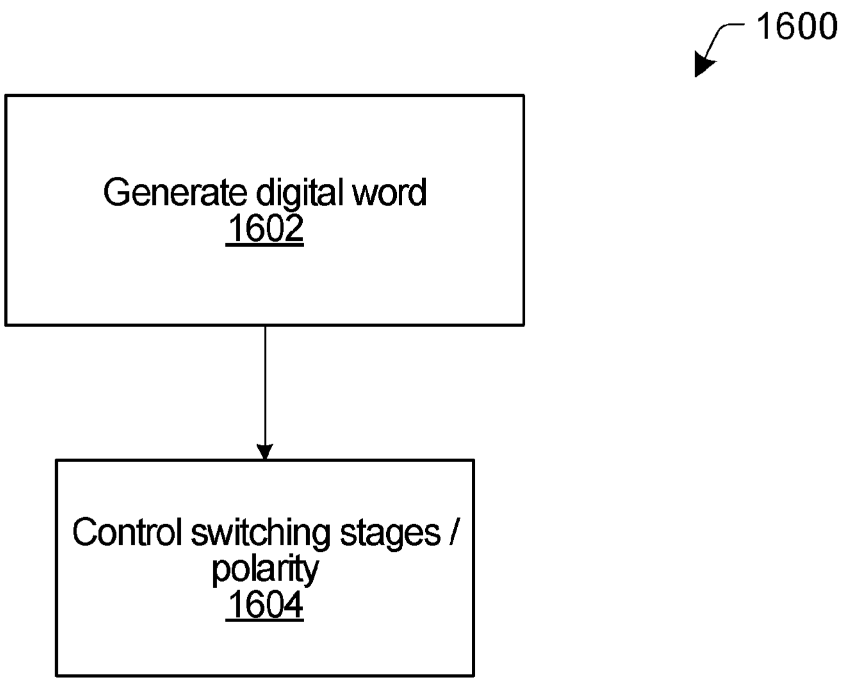
FIG. 16 is a flow diagram illustrating an example method according to an embodiment.

Method embodiments are also contemplated, and FIG. 16 is a flow diagram illustrating an example method 1600 according to an embodiment.

In some embodiments, methods relate to controlling switching in switching stages of a multi-stage switching system. The multi-stage switching system may be as defined elsewhere herein, coupled to a first power interface and a second power interface and including switching stages to convert between DC power at the first power interface and AC power at the second power interface. The switching stages are coupled together in a circuit path across the second power interface.

In general, a method may involve, at 1604 in FIG. 16, controlling switching in one of the switching stages at high frequency relative to a frequency of the AC power, and controlling switching of another of the switching stages (or each of the other switching stages) at lower frequency relative to the frequency of the AC power. The lower frequency is twice the frequency of the AC power in some embodiments.

A method may involve other features, such as filtering the AC power at the second (AC) power interface, for example.

Polarity control, also referred to herein as polarity switching, is also shown at 1604. A method may involve polarity switching at each switching stage to control polarity of the AC power at the AC power interface, as discussed at least above in the context of FIG. 1. Polarity switching of the AC power is another option, and is discussed at least above in the context of FIG. 9.

The switching stages may be identical in structure, as described elsewhere herein.

The controlling at 1604 may involve operating the switching stages to provide respective output voltages in sequential order in which the switching stages are coupled in the circuit path across the second power interface, or operating the switching stages to provide respective output voltages out of sequential order in which the switching stages are coupled in the circuit path across the second power interface if the switching stages are each configured for approximately equal fraction of voltage.

As described at least above for apparatus embodiments, in method embodiments an order in which the switching stages are operated to provide respective output voltages varies between half cycles of the AC power, such that any individual switching stage is on and provides an output voltage for different periods of time in a sequence of half cycles and is to be switched at the high frequency in one of those half cycles in the sequence.

An order in which the switching stages are operated to provide respective output voltages may also or instead be randomized.

Control of switching may involve a digital word, and FIG. 16 illustrates an example in which a digital word is generated at 1602. A digital word may be generated as shown, accessed from memory, received by a controller, or otherwise obtained.

A method may involve generating a PWM output based on n least significant bits of the digital word to control switching in one of the switching stages, and generating further outputs based on (m−n) most significant bits of the digital word to control switching in switching stages other than the one of the switching stages, as also described at least above. Some embodiments involve decoding the (m−n) most significant bits of the digital word to generate the further outputs.

Polarity control is provided in some embodiments, and a method may involve controlling polarity of the PWM output and the further outputs.

A method may also or instead involve controlling an order in which the PWM output and the further outputs are provided to the switching stages, relative to an order in which the switching stages are coupled in the circuit path across the second power interface. The order may be in the same order or out of the order in which the switching stages are sequentially coupled in the circuit path across the second power interface. For example, the order in which the PWM output and the further outputs are provided to the switching stages may be varied between half cycles of the AC power, and/or randomized.

Features disclosed herein may be implemented in combination, such that a method may involve, for example, any one or more of: decoding the (m−n) most significant bits of the digital word to generate the further outputs; generating a polarity control bit; controlling polarity of the PWM output and the further outputs based on the polarity control bit; and controlling an order in which the PWM output and the further outputs are provided to the switching stages, relative to an order in which the switching stages are coupled in the circuit path across the second power interface, based on the polarity control bit.

Architectural features disclosed herein encompass systems with multiple switching stages that, in some embodiments, are identical and, in inverter applications, each provide an approximately equal fraction of expected or target AC voltage, possibly with a margin to accommodate transients and/or other deviations. Effective selection of voltage rating may enable the use of much lower cost switches.

In some embodiments, one of these stages is switching at higher frequency than the other stages at any point in time. Higher frequency switching is perhaps best illustrated in the top plots for Stage 000 in FIGS. 6 and 15. All other stages are switching at twice the frequency of the output potential, typically 50 Hz or 60 Hz for an AC grid.

Lower voltage and fewer active high frequency switches generate less electromagnetic interference (EMI) and less loss. Put another way, higher frequency operation is enabled by lower EMI and lower loss as a result of operating fewer switches at higher frequency. Size, weight, and cost of filter components and magnetic components decreases at higher frequencies.

From an architectural standpoint, multi-stage switching systems as disclosed herein may enable, for example, implementation of two 120V split phase inverters using the same number of switches as a single 240V single phase inverter. This is significantly less costly than two 120V full-bridge inverters, and also has significantly lower cost, weight, and size than a single phase 240V inverter and a 60 Hz autotransformer, which is the normal solution in the industry for split phase inverters.

Compelling control features disclosed herein include flexibility in switching control. For example, if all switching stages are identical, then the order in which they are switched is not material to the operation. The order of operation of switching stages can be changed from half cycle to half cycle, for example, such that an individual switching stage is on for different periods of time in a sequence of half cycles and switching at high frequency in one of those half cycles in the sequence.

This type of switching control may be useful in providing balanced heat dissipation from stage to stage over the sequence. This type of switching control also causes the location of the switching stage that is switching at high frequency to vary over the sequence, which can in turn reduce radiated EMI.

Thermal balancing and/or reduced EMI may also or instead be realized in embodiments in which the order of operation of the switching stages is randomized.

What has been described is merely illustrative of the application of principles of embodiments of the present disclosure. Other arrangements and methods can be implemented by those skilled in the art.

For example, embodiments need not include all elements or components that are shown in the drawings or described herein. Embodiments may include additional, fewer, and/or different components or elements.

It should also be appreciated that features disclosed herein in the context of a particular embodiment are not limited only to that embodiment. Features may also or instead be implemented in other embodiments.

In addition, although described primarily in the context of systems and methods, other implementations are also contemplated, as instructions stored on a non-transitory computer-readable medium, for example.

The invention claimed is:

1. An apparatus comprising:

a first power interface;

a second power interface;

a multi-stage switching system, coupled to the first power interface and to the second power interface, the multi-stage switching system comprising a plurality of switching stages to convert between Direct Current (DC) power at the first power interface and Alternating Current (AC) power at the second power interface, the switching stages being coupled together in a circuit path across the second power interface, the AC power at the second power interface comprising a sum of respective per-stage outputs of the plurality of switching stages;

a controller, coupled to the multi-stage switching system, to control switching in one of the switching stages at high frequency relative to a frequency of the AC power, and to control switching of the other switching stages at lower frequency relative to the frequency of the AC power.

2. The apparatus of claim 1, further comprising:

a filter stage, coupled to the second power interface, to filter the AC power at the second power interface.

3. The apparatus of claim 1, wherein each switching stage comprises a polarity switching stage to control polarity of the AC power at the second power interface.

4. The apparatus of claim 1, further comprising:

a polarity switching stage, coupled to the second power interface, to control polarity of the AC power at the second power interface.

5. The apparatus of claim 1, wherein the lower frequency is twice the frequency of the AC power.

6. The apparatus of claim 1, wherein the switching stages are identical in structure.

7. The apparatus of claim 6, wherein the controller is configured to operate the switching stages to provide respective output voltages in sequential order in which the switching stages are coupled in the circuit path across the second power interface.

8. The apparatus of claim 6, wherein the controller is configured to operate the switching stages to provide respective output voltages out of sequential order in which the switching stages are coupled in the circuit path across the second power interface.

9. The apparatus of claim 8, wherein an order in which the controller is configured to operate the switching stages to provide respective output voltages varies between half cycles of the AC power, such that any individual switching stage is on and provides an output voltage for different periods of time in a sequence of half cycles and is to be switched at the high frequency in one of those half cycles in the sequence.

10. The apparatus of claim 8, wherein an order in which the controller is configured to operate the switching stages to provide respective output voltages is randomized.

11. A method comprising:

controlling, in a multi-stage switching system that is coupled to a first power interface and a second power interface and comprises a plurality of switching stages to convert between Direct Current (DC) power at the first power interface and Alternating Current (AC) power at the second power interface and coupled together in a circuit path across the second power interface, switching in one of the switching stages at high frequency relative to a frequency of the AC power, the AC power at the second power interface comprising a sum of respective per-stage outputs of the plurality of switching stages;

controlling switching of the other switching stages at lower frequency relative to the frequency of the AC power.

12. The method of claim 11, further comprising:

filtering the AC power at the second power interface.

13. The method of claim 11, further comprising:

polarity switching at each switching stage to control polarity of the AC power at the second power interface.

14. The method of claim 11, further comprising:

polarity switching of the AC power.

15. The method of claim 11, wherein the lower frequency is twice the frequency of the AC power.

16. The method of claim 11, wherein the switching stages are identical in structure.

17. The method of claim 16, wherein the controlling comprises operating the switching stages to provide respective output voltages in sequential order in which the switching stages are coupled in the circuit path across the second power interface.

18. The method of claim 16, wherein the controlling comprises operating the switching stages to provide respective output voltages out of sequential order in which the switching stages are coupled in the circuit path across the second power interface.

19. The method of claim 18, wherein an order in which the switching stages are operated to provide respective output voltages:

varies between half cycles of the AC power, such that any individual switching stage is on and provides an output voltage for different periods of time in a sequence of half cycles and is to be switched at the high frequency in one of those half cycles in the sequence, or is randomized.

20. An apparatus comprising:

a first power interface;

a second power interface;

a multi-stage switching system, coupled to the first power interface and to the second power interface, the multi-stage switching system comprising a plurality of switching stages to convert between Direct Current (DC) power at the first power interface and Alternating Current (AC) power at the second power interface, the switching stages being coupled together in a circuit path across the second power interface, the AC power at the second power interface comprising a sum of respective per-stage outputs of the plurality of switching stages;

a controller, coupled to the multi-stage switching system, to control switching in the switching stages based on a digital word that comprises m bits, wherein the controller is configured to generate a pulse width modulation (PWM) output based on n least significant bits of the digital word to control switching in one of the switching stages, and to generate further outputs based on (m-n) most significant bits of the digital word to control switching in switching stages other than the one of the switching stages.

* * * * *